United States Patent [19]

Cheffer

[11] Patent Number: 4,517,470

[45] Date of Patent: May 14, 1985

[54] HIGH FREQUENCY INVERTER

[75] Inventor: Harold H. Cheffer, Longwood, Fla.

[73] Assignee: NCR Corporation, Dayton, Ohio

[21] Appl. No.: 525,371

[22] Filed: Aug. 22, 1983

[51] Int. Cl.[3] .................. H02J 9/00; H02M 7/537
[52] U.S. Cl. .................................. 307/64; 307/82;
   307/83; 363/72; 363/133
[58] Field of Search ............... 307/44, 46, 58, 64,
   307/66, 82, 83, 86; 363/71, 72, 131–134

[56] References Cited

U.S. PATENT DOCUMENTS

| | | | |
|---|---|---|---|
| 4,150,424 | 4/1979 | Nuechterlein | 363/134 X |
| 4,400,624 | 8/1983 | Ebert, Jr. | 307/66 X |
| 4,400,625 | 8/1983 | Hussey | 307/66 |
| 4,425,613 | 1/1984 | Shelly | 363/71 X |

Primary Examiner—Patrick R. Salce
Assistant Examiner—Derek S. Jennings
Attorney, Agent, or Firm—J. T. Cavender; Wilbert Hawk, Jr.; Richard W. Lavin

[57] ABSTRACT

A pulse width modulated D. C. to A. C. inverter circuit includes a first set of MOSFETS operated at a line frequency for transmitting high frequency clock pulses to a second set of MOSFETS for outputting a D. C. signal derived from a D. C. source. The inverter is part of an uninterruptable power supply and is operated upon the failure of the line A. C. to supply A. C. signals to a load. The high frequency clock signals are modulated on the A. C. output of the inverter. Two separate and distinct power switching channels are provided with each channel supplying one half of the sine wave outputted by the inverter.

15 Claims, 11 Drawing Figures

| FIG. 2A | FIG. 2B | FIG. 2C |
| --- | --- | --- |
| FIG. 2D | FIG. 2E | FIG. 2F |

HIGH FREQUENCY INVERTER

CROSS-REFERENCE TO RELATED APPLICATIONS

Phase Synchronization and Control Circuit, co-pending application, Ser. No. 525,369, filed on Aug. 22, 1983, invented by Paul M. Rhoads and Harold H. Cheffer, assigned to the NCR Corporation.

Snubber Circuit for Use In An Uninterruptible Power Supply, co-pending application, Ser. No. 525,370 Aug. 22, 1983 herewith, invented by Harold H. Cheffer, assigned to the NCR Corporation.

Power MOSFET Transfer Switch, co-pending application, Ser. No. 525,209 filed on Aug. 22, 1983, invented by Harold H. Cheffer, assigned to the NCR Corporation.

BACKGROUND OF THE INVENTION

1. Field of the Invention

The present invention is directed to uninterruptible power supplies and more particularly to an inverter for supplying an alternating current to a load from a storage source of direct current.

2. Description of the Prior Art

In today's wide use of computers, data processors, controllers, etc. in data processing systems, it is extremely critical that the system be supplied with continuous power during its operation. Due to inadequate capacity and increasing load demands, commercially-supplied power is often subject to complete failure of the power signals or a reduction in the magnitude of the available voltage during peak demand periods. In cases where various customers subject the power system to sudden electrical loads, transients are generated in the system affecting the magnitude and phase of the supplied power signal.

Since the storage of data in a computer system is predicated on the continuous operation of the computer, power interruptions can adversely affect the integrity of the stored data. When the power drops abruptly, the computer will terminate operation probably with a high possibility of component damage. In order to overcome this situation, computers operating in a data processing system environment have been supplied with uninterruptible power supplies. Such uninterruptible power supplies have been designed where the primary commercial power source and the reserve power source are connected in parallel. Both the primary power source and the reserve power source are continuously operated and both sources contribute to the energizing of the load.

In a prior uninterruptible power supply arrangement, the power supply includes a commercial A.C. line power source and a D.C. voltage energized inverter power source connected in parallel to a switching mechanism which alternately couples one or the other of the two power supplies to a load to be energized. It is desirable that the auxiliary power source comprising the inverter be switched into the A.C. power line at the time the A.C. line power source fails. Prior inverters using controlled rectifiers or other types of switching members require switching to occur at the zero crossing point of the line signal.

It is therefore a principal object of this invention to provide a D.C. to A.C. inverter for generating A.C. power signals from a D.C. source at the time of power failure of the A.C. line source.

It is another object of this invention to provide an inverter using semiconductor field-effect transistors (MOSFET) for switching the output of a D.C. source at a high frequency rate which is synchronized with the line frequency.

It is a further object of this invention to provide an inverter which is simple in construction and low in cost.

SUMMARY OF THE INVENTION

These and other objects of the invention are accomplished by providing an inverter which includes a pulse-width modulated driver circuit driving first and second pairs of switching MOSFET's having a common connection to one side of a D.C. source. The output of each pair of MOSFETs drives a high frequency power transformer having a center tap which is connected to the other side of the D.C. source. The output signal of each of the transformers includes a gating MOSFET which is cycled at the line frequency to switch the output signal of each of the transformers which are then rectified and filtered to provide one-half of a sine wave. The sine wave output of the inverter is tapped to be fed back to the pulsewidth modulated driver which compares the output sine wave with a rectified reference sine wave to output high frequency signals based on the compared rectified sine wave for controlling the duty cycle and the on-off times of the switching MOSFETs. The gating circuit is enabled when failure of the A.C. line source occurs which controls the operation of the gating MOSFETs to enable the inverter at the time of failure to output the A.C. power signals at the line frequency.

BRIEF DESCRIPTION OF THE DRAWINGS

Additional advantages and features of the present invention will become apparent and fully understood from a reading of the following description, taken together with the annexed drawings.

DESCRIPTION OF THE PREFERRED EMBODIMENT

Figure 1:
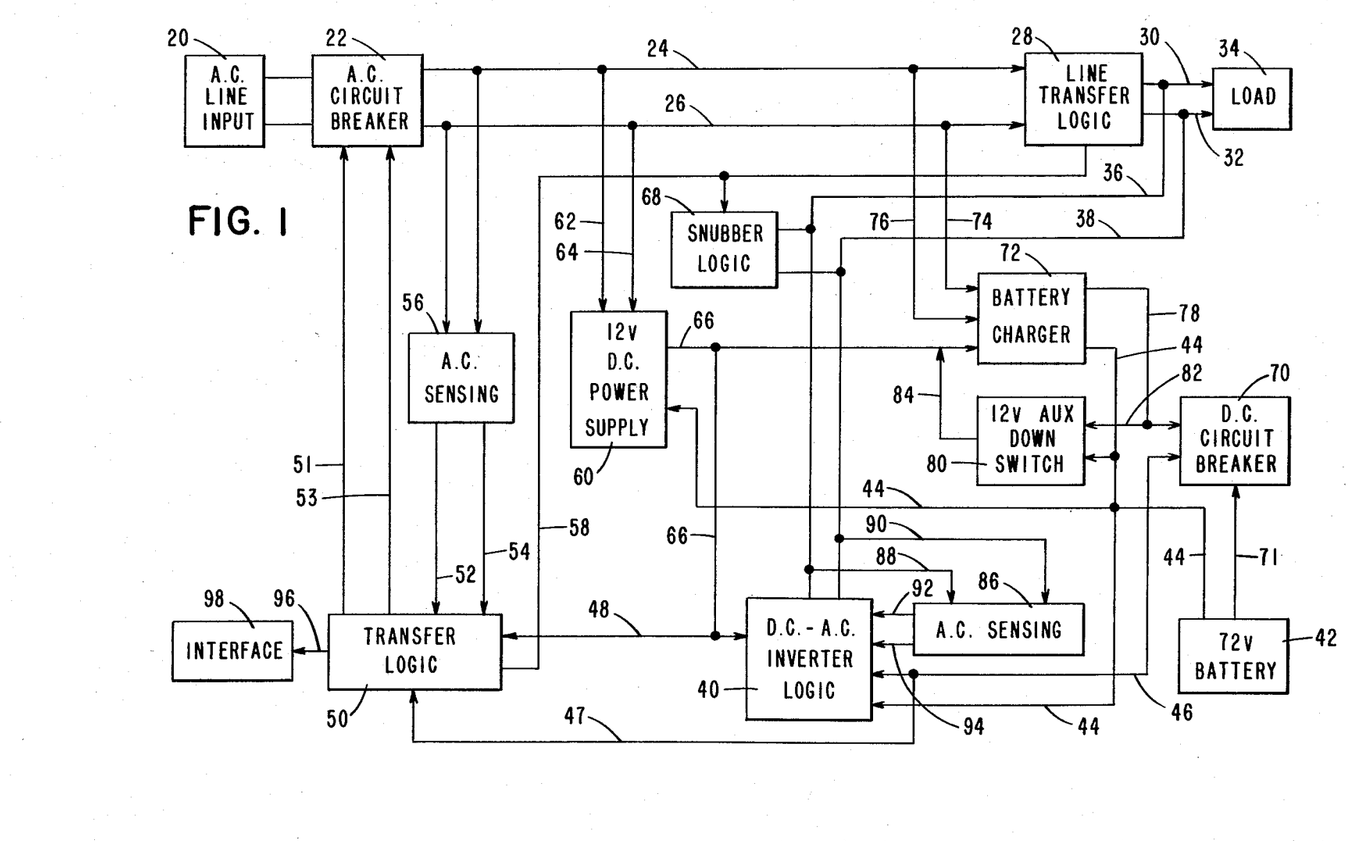
FIG. 1 is a block diagram of the uninterruptible power supply in which the inverter of the present invention is utilized.

Referring now to FIG. 1, there is shown a block diagram of the uninterruptible power supply in which the inverter of the present invention is found. Included in the power circuit is the A.C. line input circuit 20 over which appears the A.C. power signals supplied from a commercial power source and which are transmitted through an A.C. circuit breaker 22 and over lines 24, 26 to the line transfer logic circuit 28 which includes the transfer switching circuit of the present invention. The line transfer logic circuit 28 will output over lines 30, 32 to the load 34 an A.C. signal received over lines 24, 26 from the A.C. line input circuit 20. The load 34 also receives A.C. signals transmitted over lines 36, 38 from a D.C. to A.C. inverter logic circuit 40 of the present invention which, when enabled, will convert the D.C. signal output of a 60 volt battery 42 received over the common ground line 44 and line 46 to an A.C. signal. The inverter logic circuit 40 is enabled by signals appearing on bus 48 when generated by a transfer logic circuit 50 which receives signals over lines 52, 54 from an A.C. sensing circuit 56 representing the signal level of the A.C. signals being outputted from the A.C. circuit breaker 22. The transfer logic circuit 50, upon sensing a drop in the signal level of the line A.C. signal, will output control signals over bus 48 to the inverter logic circuit 40 and bus 58 to the line transfer logic circuit 28 enabling the inverter logic circuit 40 to output A.C. power signals over lines 36, 38 to the load 34 through lines 30, 32. When the A.C. line input 20 returns to its normal power level, the transfer logic circuit 50 will enable the line transfer logic circuit 28 to switch back to the input lines 24, 26 allowing the A.C. line input circuit 20 to supply the power over lines 36, 38 to the load 34. This switching of the line input circuit 20 occurs in phase with the original line frequency of the signal appearing at the line input circuit 20. The transfer logic circuit 50 outputs over lines 51, 53 signals for disabling the A.C. circuit breaker circuit 22 when a system overload occurs. The circuit 50 also outputs over line 96 to an interface circuit 98 a signal indicating the operating condition of the power supply.

Further included in the power supply is a 12 volt D.C. power supply 60 which receives the A.C. power signals over lines 62 and 64 and converts them to a 12 volt D.C. signal which is supplied over line 66 to power the various logic circuits in the power supply. Also included in the power supply is the snubber logic circuit 68 which eliminates any abnormal current spikes which occur during the switching of the transfer logic circuit 28 between the A.C. line input circuit 20 and the inverter logic circuit 40. The circuit 68 receives control signals over bus 58 from the transfer logic circuit 50 and from the inverter logic circuit 40. Associated with the 60 volt battery 42 is a D.C. circuit breaker 70 connected to the battery 42 over line 71 and providing a current overload protection for the battery 42, a battery charging circuit 72 which converts the A.C. line signals appearing on lines 74, 76 to a charging current which is then supplied to the battery 42 over line 78 during the time the A.C. line power signals are available and a 12 volt auxiliary down switch 80 which supplies a 12 volt D.C. signal to power the logic circuits upon the failure of the A.C. line input. The switch 80 drops the 60 volt signal supplied over line 82 from the battery 42 through the circuit breaker 70 and outputs the 12 volt D.C. signal over lines 84 and 86 to the required logic circuits of the power supply.

Associated with the inverter logic circuit 40 is an A.C. sensing circuit which receives over lines 88, 90 the A.C. signal output of the inverter logic circuit 40, which is used to regulate the amplitude and shape of the A.C. signal outputted by the logic circuit 40. The sensing circuit 86 drops the A.C. output signal level to 5 volts to allow the signal to be compared with the signal being outputted by the logic circuit 40.

Figure 4A:
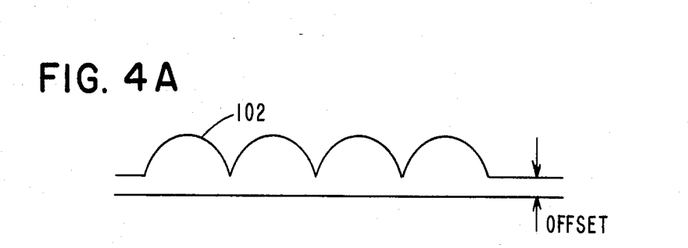
FIGS. 4A-4C inclusive disclose the waveforms of the signals occurring during the operation of the inverter.
Figure 4B:
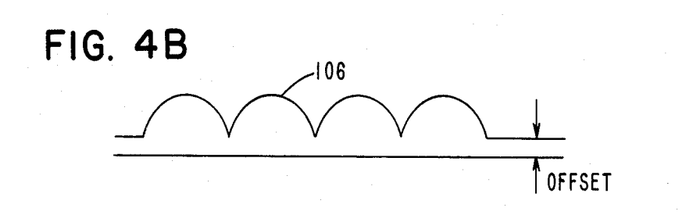

Referring now to FIGS. 2A–2F inclusive, there is disclosed a schematic representation of the inverter of the present invention for generating a plurality of A.C. power signals from the 60 volt D.C. battery 42 (FIG. 1). Included in the circuit is a 3525A pulsewidth modulator circuit (PWM) 100 (FIG. 2A) which is commercially available from Silicon General Corporation of Garden Grove, Calif. Unless otherwise noted, all of the circuit elements herein described are commercially available from the National Semiconductor Corporation of Mountain View, Calif. The PWM 100 receives a reference sine wave signal REF comprising the rectified sine wave 102 (FIG. 4A) over line 104 of the bus 48 (FIG. 1) from the transfer logic circuit 50 (FIG. 1). For a complete description of the transfer logic circuit 50 and the circuitry for the generation of the signal REF, reference should be made to the previously-cited co-pending application of Rhoads et al., Ser. No. 525,369, which application is fully incorporated herein by reference. The PWM circuit 100 also receives over line 92 the rectified output sine wave signal 106 (FIG. 4B) of the inverter which is taken from the output lines 36, 38 (FIGS. 1 and 2C) of the inverter over lines 88, 90 and through the A.C. sensing circuit 86 (FIG. 1) comprising the diodes 108–120 inclusive (FIG. 2D) and the dropping resistor 122 with the signal being transmitted over line 92 to the PWM circuit 100. The diodes 116–120 inclusive provide the off-set from ground for the sine wave signal 106 at a voltage level derived from a 5 volt source appearing on line 94 through the dropping resistor 122 while the diodes 108–114 inclusive rectify the sine wave signal appearing on lines 88, 90 (FIGS. 2C–2F inclusive). The resistors 124–128 inclusive comprise a voltage divider which adjusts the signal to a positive 7 volts so as to enable the signal to be compared with the reference signal 102 (FIG. 4A).

The signal 106 appearing at the output of the diodes 108–114 inclusive is transmitted over line 121 (FIG. 2D) and through the dropping resistor 123 as the signal SIG to the transfer logic circuit 50 over bus 48 where it is used in detecting the failure of the line A.C. input circuit 20 to output the required voltage level of the A.C. signal resulting in the generation of the signal POWER FAIL. Reference should be made to the previously co-pending application of Rhoads et al., Ser. No. 525,369, for complete description of the circuit for generating the signal POWER FAIL in which the signal 106 is utilized. Further included in this circuit are the resistors 125 and 127 (FIG. 2C) forming a voltage divider circuit which adjusts the signal to a positive voltage while the capacitor 129 and the diode 131 permit a 0.7 D.C. signal off-set.

The PWM circuit 100 will output a plurality of high frequency clock pulses 130 (FIG. 4C) at a 50 KHz. rate separated by a width representing the voltage level of a simulated sine wave in a manner that is well-known in the art. The width between the pulses 130 are adjusted in accordance with the result of comparing the sine wave signal 106 (FIG. 4B) with the reference sine wave signal 102 (FIG. 4A). Controlling the operation of the PWM circuit are the resistor 134 and capacitor 138 which set the 50 KHz. oscillator frequency of the circuit. Resistor 132 sets the dead time between the 50 KHz. clock pulses while capacitor 136 provides a slow start for slowing down the response of the PWM circuit to eliminate the occurrence of system oscillations. Dropping resistor 144, 146 reduces the signal level of the sine waves 102, 106 enabling the PWM circuit 100 to compare the two signals.

Figure 2A:
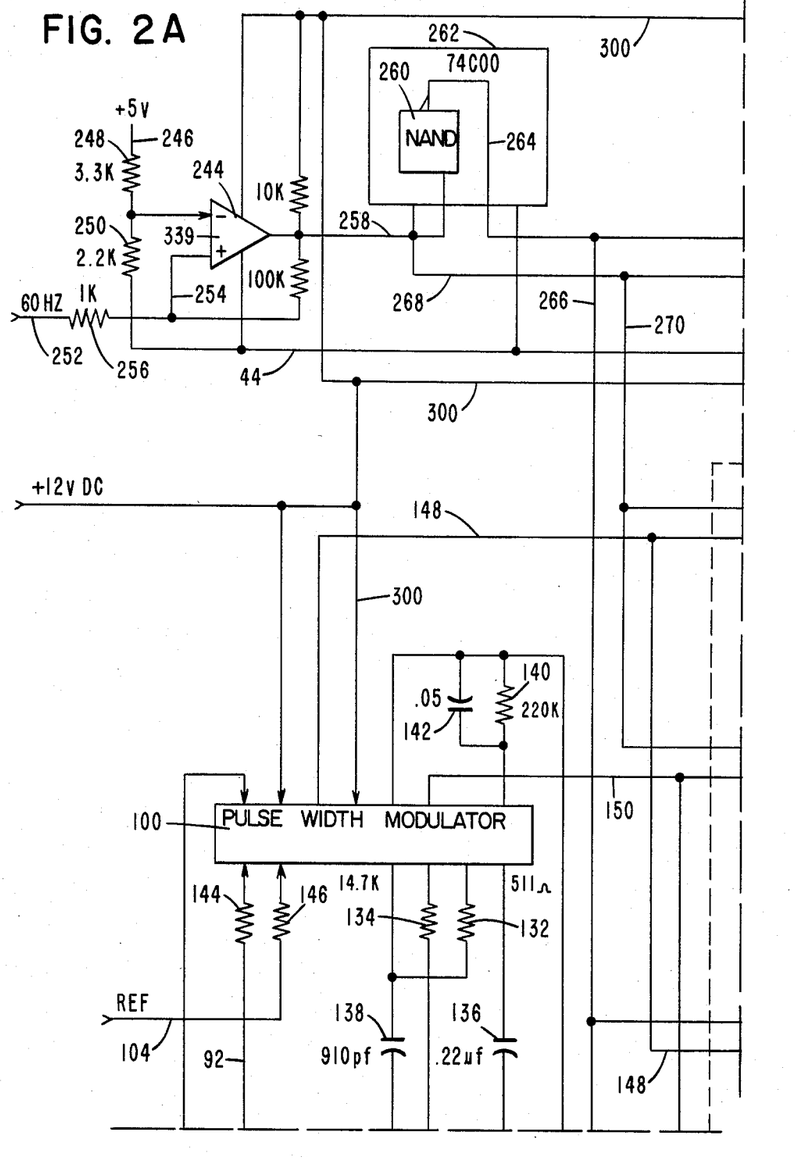
FIGS. 2A-2F inclusive, taken together, form a schematic representation of the inverter of the present invention.
Figure 2B:
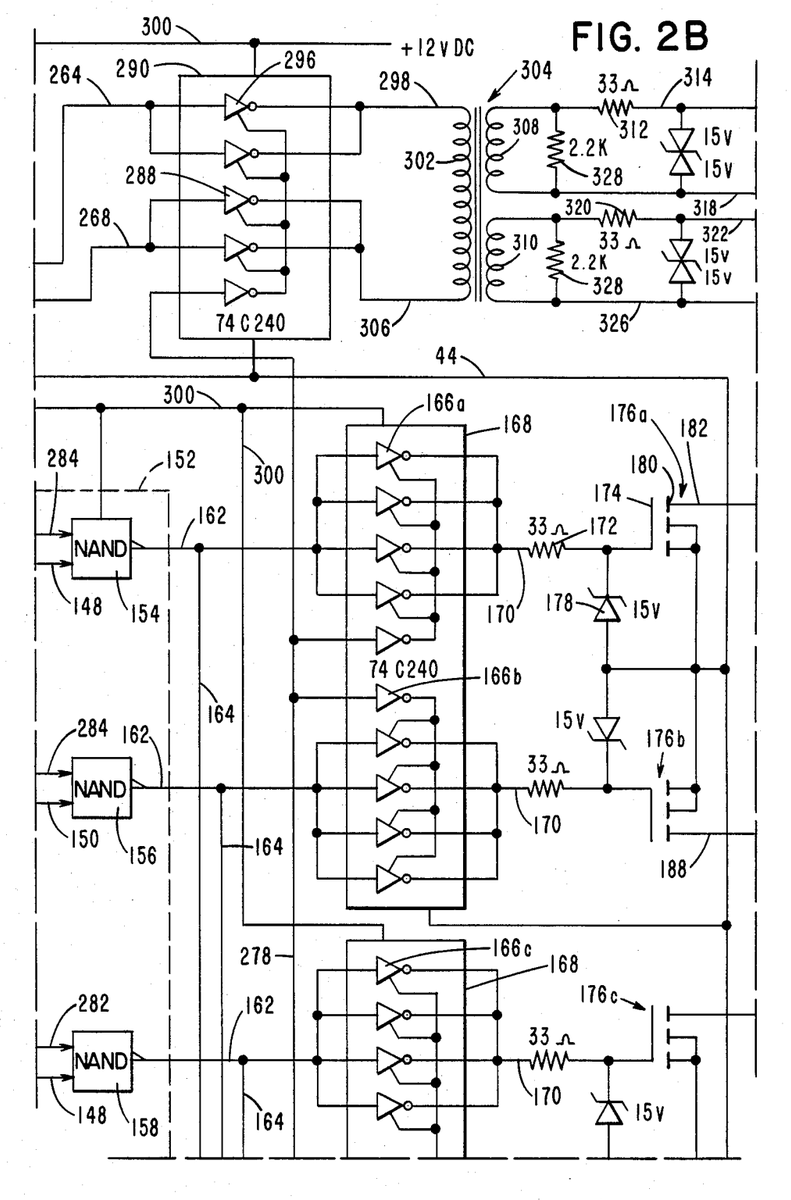
Figure 2C:
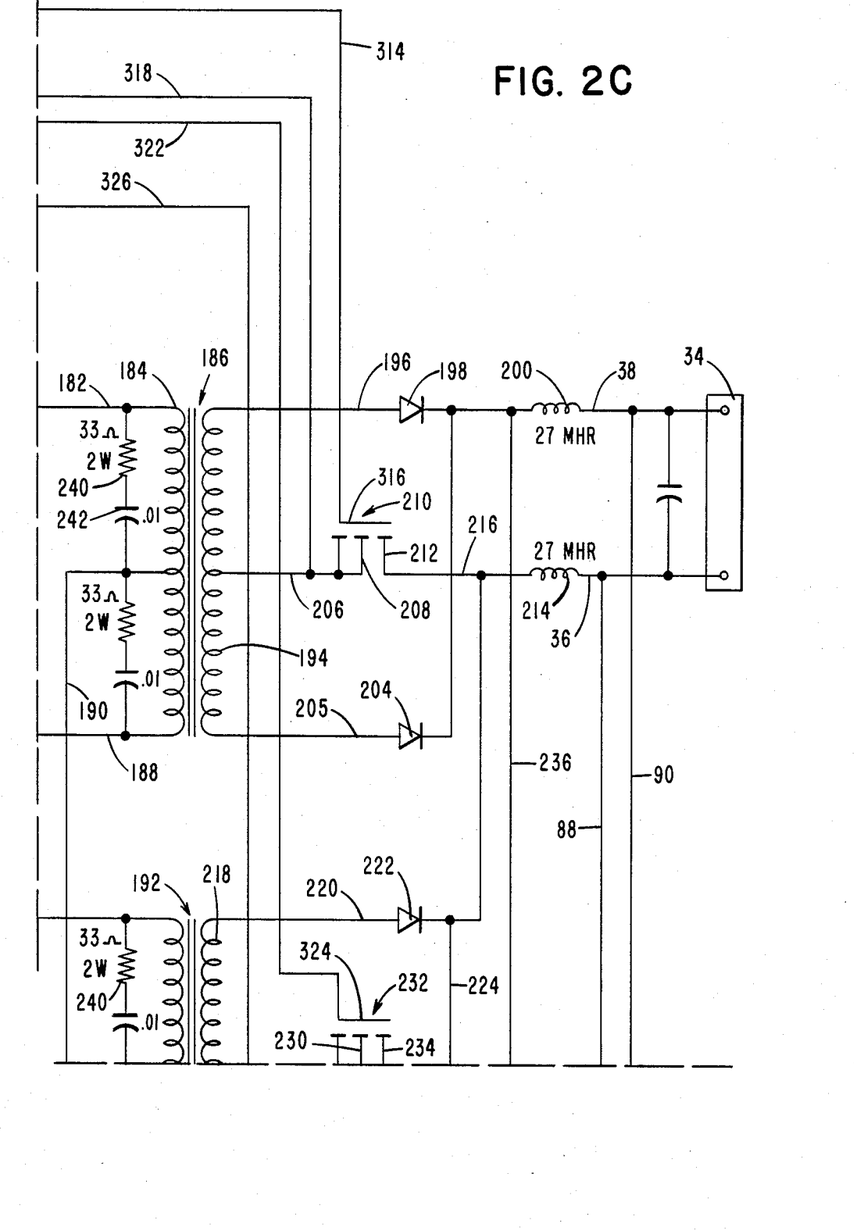
Figure 2D:
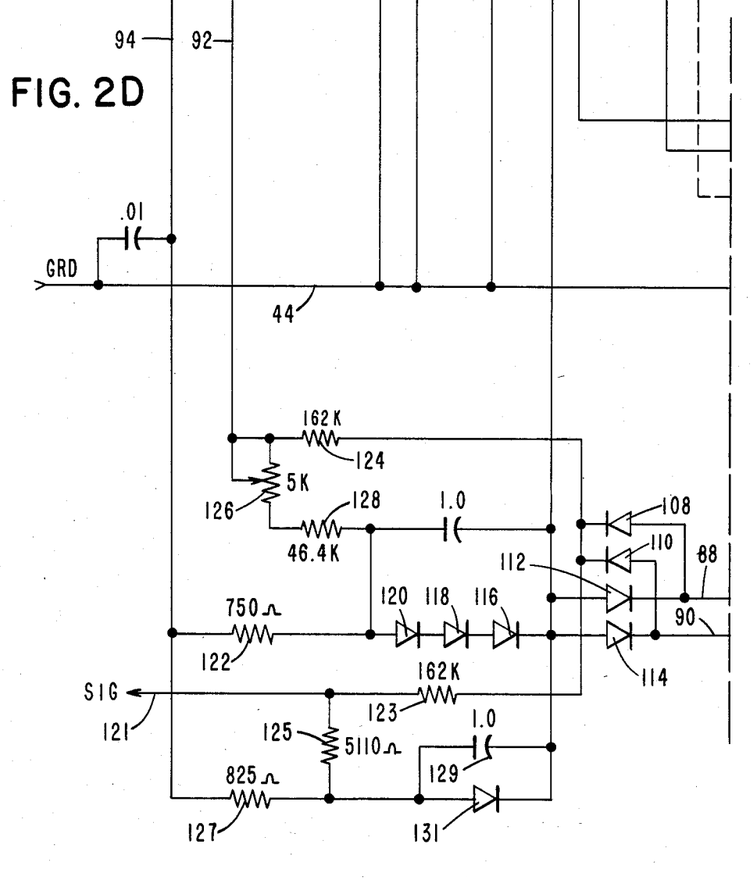
Figure 2E:
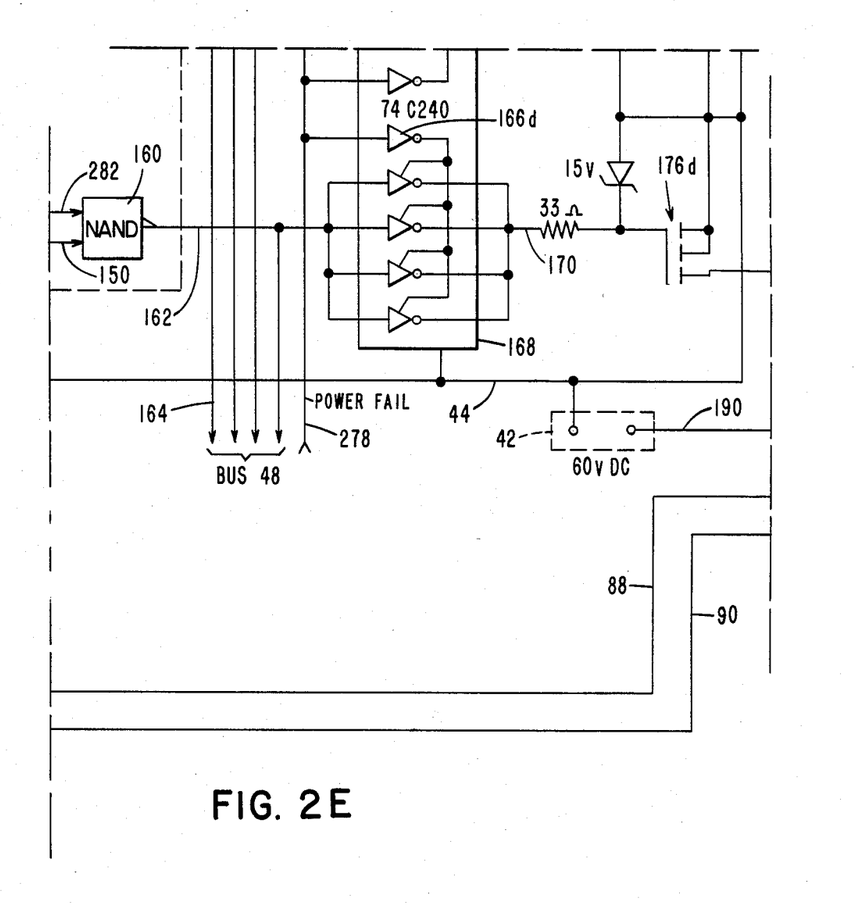
Figure 2F:
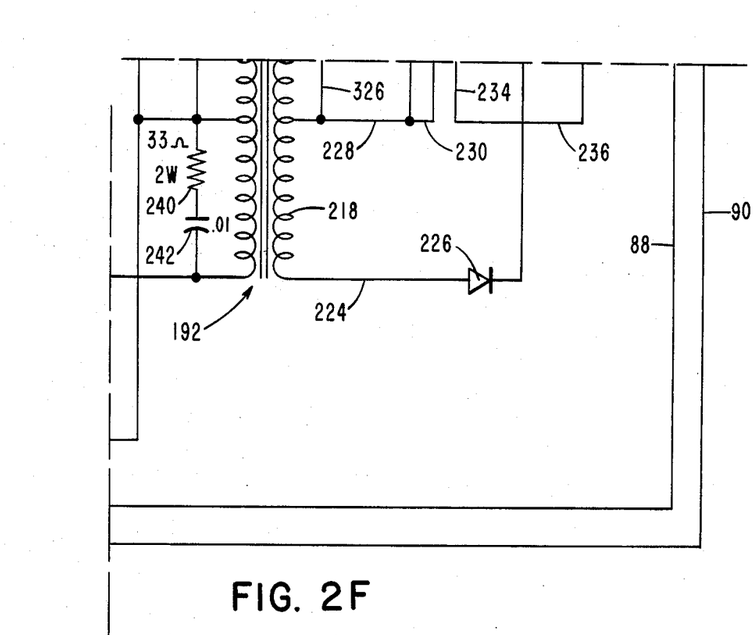
Figure 3:
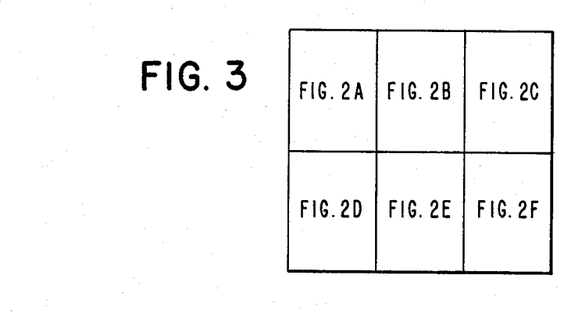
FIG. 3 is a diagram showing the manner in which FIGS. 2A-2F inclusive are arranged with respect to each other to form the inverter.

The PWM circuit 100 outputs the pulses 130 (FIG. 4C) over lines 148, 150 to a 74C00 quad NAND circuit 152 (FIG. 2B) in which the pulses 130 are transmitted into one input of the NAND gates 154–160 inclusive. The clock pulses 130 appearing on line 148 are 180 degrees out of phase with the pulses 130 appearing on line 150. As will be described more fully hereinafter, the other inputs of the NAND gates 154-160 inclusive receive synchronizing control pulses which occur 180 degrees out of phase enabling the gates 154 and 156, and 158, 160 to be alternately enabled to output over line 162 the pulses 130 to a plurality of inverting current drivers 166a-166d inclusive which are part of a pair of 74C240 octal driver circuits 168 (FIGS. 2B and 2E). The drivers 166 output the 50 KHz. pulses 130, when enabled, over line 170 through the dropping resistor 172 to the gate terminal 174 of a switching metal oxide semiconductor field effect transistor (MOSFET) generally indicated by the numeral 176a, the pulse forward biasing the transistor.

In a similar manner, each of the NAND gates 156-160 inclusive (FIGS. 2B and 2E) when enabled will drive an associated MOSFET 176b-176d inclusive to the same condition. A zener diode 178 holds the voltage level applied to the gate terminal 174 of MOSFET 176a to a level of 15 volts. The MOSFET 176a is forward biased by each 50 KHz. clock pulse 130 (FIG. 4C) appearing on line 170 enabling the MOSFET to output the clock pulses through the drain terminal 180 and over line 182 to one side of the primary windings 184 (FIG. 2C) of a transformer generally indicated by the numeral 186. The other end of the primary windings 184 is connected to the drain terminal 188 of the MOSFET 176b (FIG. 2B) enabling the 50 KHz. clock pulses 130 (FIG. 4C) modulated by the PWM circuit to drive the transformer 186 which receives over the center tap line 190 current from the 60 volt battery 42 (FIGS. 1 and 2E). In a similar manner, a second transformer generally indicated by the numeral 192 (FIGS. 2C and 2F) is driven in a similar manner by the operation of the MOSFETS 176c and 176d (FIG. 2B).

The transformer 186 includes the secondary windings 194 (FIG. 2C), one side of which is connected over line 196 to a rectifying diode 198 and a filter inductor or choke 200 and then over line 38 (FIG. 1) to one side of the load 34. The other side of the transformer windings 194 is connected to the line 196 through the rectifying diode 204 and line 205. A center tap line 206 from the secondary windings 194 of the transformer 186 is connected to the source terminal 208 of a MOSFET generally indicated by the numeral 210 whose drain terminal 212 is connected through an inductor 214 to the other side of the load 34 (FIG. 1) over lines 216 and 36. In a similar manner, one side of the secondary windings 218 of transformer 192 is connected over line 220 through the diode 222 to the line 216 while the other side of the windings is connected through line 224 (FIG. 2F), the diode 226 and line 220 to the line 216. The center tap line 228 of the secondary windings 218 is connected to the source terminal 230 (FIG. 2C) of a second MOSFET generally indicated by the numeral 232 whose drain terminal 234 is connected over line 236 to line 196. The primary windings of the transformers 186, 192 are biased by the resistor 240 and capacitor 242 to damp out any voltage transients developed by the windings when any of the MOSFETs 176a-176d inclusive are shut off. As will be explained more fully hereinafter, the transformers 186 and 192 are operated 180 degrees out of phase to generate the positive and negative portions of a sine wave which is transmitted over lines 36, 38 (FIG. 1) to the load 34.

The MOSFETS 176a-176d inclusive (FIGS. 2B and 2E) and the MOSFETs 210, 232 (FIG. 2C) are operated by a control circuit including an LM339 quad comparator 244 (FIG. 2A) which receives at its inverting input a 2 volt signal derived from a 5 volt power supply (not shown) appearing on line 246 and whose voltage level is dropped through a divider circuit comprising the resistors 248, 250. The non-inverting input of the comparator 244 receives over line 252, 254 and through the dropping resistor 256 a plurality of 60 Hz. clock pulses which are synchronized with the frequency of the A.C. line input. These signals are transmitted over bus 48 (FIG. 1) from the Transfer Logic circuit 50. For a full description of the generation of the 60 Hz. clock pulses, reference should be made to the previously-cited co-pending patent application, Ser. No. 525,369 of Rhoads et al.

Figure 4C:
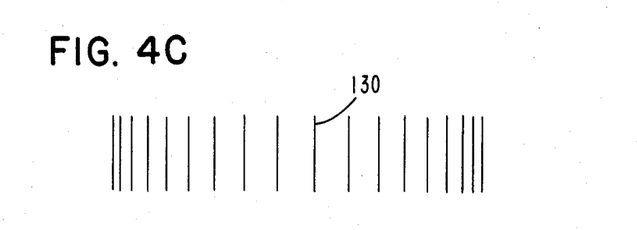

The 60 Hz. clock signals outputted by the comparator 244 are transmitted over line 258 to the input of a NAND gate 260 which is part of a 74C00 quad NAND gate integrated circuit 262. The inverted output signals of the gate 260 are transmitted over lines 264 and 266 to one input of the NAND gates 158 and 160 (FIGS. 2B and 2E) enabling the NAND gates to output the 50 KHz. out of phase clock pulse appearing on lines 148 and 150, the pulses being transmitted over line 162 to the inverting line drivers 166c and 166d. In a similar manner, the 60Hz. clock signals appearing on line 258 are transmitted over lines 268 and 270 to the NAND gates 154 and 156 (FIG. 2B) enabling the NAND gates 154, 156 to output the 50 KHz. out of phase clock pulses to the line drivers 166a and 166b which are enabled by a control signal POWER FAIL appearing on line 278 and which is low when the line voltage appearing on lines 24, 26 (FIG. 1) falls below a predetermined value. The signal POWER FAIL is transmitted over bus 48 (FIG. 1) from the Transfer Logic Circuit 50 to the Inverter logic circuit 40. Reference should be made to the previously-cited co-pending applications, Ser. Nos. 525,369 and 525,209 for a complete description of the generation of the signal POWER FAIL. It will be seen from this construction that when the main A.C. power source fails, the line drivers 166a and 166b will output the 50 KHz. clock signals appearing on lines 148 and 150 over line 170 to the MOSFETs 176a and 176b (FIG. 2B) enabling the MOSFETs to drive the transformer 186 (FIG. 4C). In a similar manner, the line drivers 166c, 166d (FIGS. 2B and 2E) will output over line 170 the clock pulses appearing on lines 148 and 150 to the MOSFETs 176c and 176d. Since the clock pulses appearing on line 266 (FIG. 2A) are 180 degrees out of phase with the clock pulses appearing on line 270, the MOSFETs 176a, 176b will be operated out of phase with respect to the MOSFETs 176c and 176d.

The 60 Hz. clock pulses appearing on line 268 (FIG. 2A) are also transmitted to a pair of line inverting drivers 288 (FIG. 2B) which are part of a 74C240 octal inverting line driver circuit 290. In a similar manner, the inverted clock pulses appearing on the output line 264 of NAND gate 260 are transmitted to a pair of inverting drivers 296 of the circuit 290 which output the clock pulses to one side of the primary windings 302 of the transformer generally indicated by the numeral 304. The other end of the primary windings 302 is connected to the output of the driver 288 by line 306.

The transformer 304 includes first secondary windings 308 and second secondary windings 310. One end of windings 308 is connected through a resistor 312 and by line 314 to the gate terminal 316 of the MOSFET 210 (FIG. 2C), while the other end of the windings 308 is connected by line 318 to the source terminal 208 of MOSFET 210 through line 206. In similar manner, one side of the secondary windings 310 is connected to the resistor 320 and by line 322 to the gate terminal 324 (FIG. 2C) of the MOSFET 232. The other side of the windings 310 is connected by line 326 to the source terminal 230 of MOSFET 232 through line 228. The circuit further includes resistors 328 (FIG. 2B) each connected across the secondary windings of the transformer 304 to discharge the gate-source capacitance of the MOSFETS 210 and 232 while the zener diodes 330, 332 limit the voltage level of the pulses outputted by the secondary windings 308, 310 to 15 volts. The circuit elements are powered by a 12 volt power supply appearing on line 300 (FIGS. 2A and 2B).

In the operation of the inverter, the 60 Hz. sync clock pulses appearing on line 252 (FIG. 2A) will alternately enable the pair of NAND gates 154, 156 and 158, 160 (FIG. 2B). Each pair of gates are enabled during the high cycle of each clock pulse. Simultaneously with this operation, the PWM circuit 100 (FIG. 2A) is comparing the rectified sine wave 106 (FIG. 4B) appearing on the output lines 36, 38 (Fig. 2C) of the inverter with the rectified reference sine wave 102 (FIG. 4A) appearing on line 104. The PWM circuit 100 will generate two sets of square wave clock pulses 130 (FIG. 4C) in response to comparing the sine waves, the signals 130 being outputted at a 50 KHz. rate. The first set of signals 130 are outputted over line 148 to the NAND gates 154, 158 while the second set of signals 130, being out of phase by 180 degrees to the first set of signals are outputted over line 150 to the NAND gates 156 and 160. The output signals of gates 154–160 inclusive are also transmitted over lines 164 (FIG. 2B), which are a part of bus 48 (FIG. 1), to the Transfer logic circuit 50 for use in controlling the operation of the Snubber logic circuit 68 (FIG. 1).

Depending on the NAND gates 154–160 inclusive that are enabled by the enabling signal being outputted by the NAND gate 260 at the 60 Hz. rate, the signals 130 will alternately switch the operation of the MOSFETS 176a and 176b (FIG. 2B) during the first half of the 60 Hz. clock signal and MOSFETS 176c and 176d during the second half of the 60 Hz. clock signal. This operation will occur at the time the signal POWER FAIL appearing on line 278 goes low indicating the occurrence of a power failure of the A.C. line source. The switching of the MOSFETS 176a–176d inclusive results in the switching of the transformers 186, 192 (FIG. 2C) which chops the voltage output of the 60 volt D.C. battery 42 enabling the filter chokes 200, 214 to output an A.C. signal over lines 36, 38 to the load 34 (FIG. 1). During the first half of the 60 Hz. clock signals, the MOSFET 210 (FIG. 2C) is enabled allowing the diode 198 to rectify the clock pulses and the filter choke 200 to output the positive portion of the sine wave appearing on the output lines 36 and 38. In a similar manner, the MOSFET 232 (FIG. 2C) is operated allowing the diode 222 and the filter choke 200 to output the negative portion of the sine wave. When either of the MOSFETS 210, 232 are operated, the other MOSFET is disabled, blocking a return path for the current to the inactive transformer. It will be seen from this construction that as soon as the power fail signal is generated, the inverter is operated for outputting an A.C. signal to the load enabling the load to continue its operation without interruption.

Numerous modifications and adaptations of the system of the present invention will be apparent to those skilled in the art, and thus it is intended by the appended claims to cover all such modifications and adaptations which fall within the true spirit and scope of this invention.

I claim:

1. In an uninterruptible power supply which includes a main source of A.C. signals for operating a load, an inverter circuit for outputting auxiliary A.C. signals to the load comprising:

a source of reference A.C. signals;

pulse width modulating means connected to the output of the inverter circuit and the source of reference A.C. signals for comparing the auxiliary A.C. signal of the inverter circuit transmitted to the load with the reference A.C. signals to output a plurality of clock signals modulated in accordance with the voltage difference between the signals;

a D.C. source;

first switching means connected to said D.C. source and said modulating means and operated by said modulated clock signals to output a plurality of auxiliary A.C. signals when enabled;

a source of control signals transmitted to said first switching means for enabling said switching means upon failure of the main source to supply A.C. signals to the load;

second switching means connected to the load, said modulating means and said first switching means for transmitting the auxiliary A.C. signals to the load and said modulating means when enabled;

a source of system clock signals; and control means connected to said second switching means and operated by said system clock signals for enabling said second switching means in association with said system clock signals whereby said second switching means will output the auxiliary A.C. signals to the load and said modulating means.

2. The inverter circuit of claim 1 in which the modulated clock signals outputted by said modulating means comprises the first and second oppositely phased clock signals and said first and second switching means includes first and second switching members each receiving one of said oppositely phased clock signals whereby the first switching members will output a first portion of the auxiliary A.C. signals and the second switching members will output a second portion of the auxiliary A.C. signals.

3. The inverter circuit of claim 2 in which said first switching means includes a first transformer means connected to said D.C. source and said first switching members of said first and second switching means and a second transformer means connected to said D.C. source and said second members of said first and second switching means for transmitting said oppositely phased clock signals between said first and second switching members, said second switching means being connected to a mid portion of the transformer means to transmit a portion of the auxiliary A.C. signal when operated.

4. The inverter circuit of claim 3 in which said first and second switching members each comprise a metal oxide semiconductor field effect transistor.

5. The inverter circuit of claim 3 in which said control means includes first gating means receiving said system clock signals for outputting first and second oppositely phased system clock signals, said gating means connected to said first and second switching members of said second switching means enabling said first switching member to output a first portion of the auxiliary A.C. signals and the second switching member to output a second portion of the auxiliary A.C. signal.

6. The inverter circuit of claim 5 which further includes second gating means connected to said modulating means and said first gating means for outputting said first and second oppositely phased clock signals to said first and second switching member of said first switching means in response to receiving said first and second oppositely phased system clock signals.

7. The inverter circuit of claim 6 in which said control means further include third transformer means connected to said first gating means and said first and second switching members of said second switching means for outputting said first and second oppositely phased system clock signals to said switching members enabling said switching members to output a first and second portion of the auxiliary A.C. signals to the load.

8. In an uninterruptible power supply which includes a main source of A.C. signals for operating a load, an inverter circuit for outputting auxiliary A.C. signals to the load comprising:
a source of reference A.C. signals;
pulse width modulating means connected to the output of the inverter circuit and receiving said reference A.C. signals for comparing the auxiliary A.C. signals and the reference A.C. signals and outputting a plurality of high frequency clock signals modulated in accordance with the voltage difference between the signals;
a D.C. source;
first switching means including a pair of first and second transistors connected to said modulating means, said transistors outputting said high frequency clock signals when enabled;
a source of first control signals transmitted to said first switching means for enabling said transistors upon failure of the main source to supply A.C. signals to the load;
a first transformer member connected to said pair of first transistors and said D.C. source to output a first portion of the auxiliary A.C. signals;
a second transformer member connected to said pair of second transistors and said D.C. source to output a second portion of the auxiliary A.C. signals;
a source of system clock signals;
second switching means connected to said first and second transformer members for outputting the first and second portions of the auxiliary A.C. signals to the load when enabled; and
control means connected to said second switching means and operated by said system clock signals for enabling said switching means in accordance with said system clock signals whereby said second switching means will output the auxiliary A.C. signals to the load.

9. The inverter circuit of claim 8 in which the high frequency clock signals outputted by said modulating means comprise first and second oppositely phased high frequency clock signals and said first switching means further includes first gating means connected to said modulating means and said control means for outputting said first and second oppositely phased high frequency clock signals to said first and second transistors in response to the operation of said control means.

10. The inverter circuit of claim 9 in which the first switching means further includes first drive means connected to said first gating means and said first and second transistors, said drive means enabled by said first control signals to output said first and second oppositely phased high frequency clock signals to said first and second transistors.

11. The inverter circuit of claim 10 in which said second switching means comprises a third transistor connected to said first transformer members and a fourth transistor connected to said second transformer member, said third and fourth transistors connected to said control means and operated in response to the operation of said control means to output the auxiliary A.C. signals to the load.

12. The inverter circuit of claim 11 in which said first, second, third and fourth transistors are metal oxide semiconductor field effect transistors.

13. The inverter circuit of claim 12 in which said control means includes second gating means connected to said first gating means and said third and fourth transistors and receiving said system clock signals for outputting first and, second oppositely phased system clock signals enabling the operation of the first gating means and the third transistor to output a first portion of the auxiliary A.C. signal and the fourth transistor to output a second portion of the auxiliary A.C. signal.

14. The inverter circuit of claim 13 in which said control means further includes second drive means connected to said second gating means for outputting said first and second oppositely phased system clock signals and a third transformer member connected to said second drive means and said third and fourth transistors for outputting the said first and second oppositely phased system clock signals whereby said third and fourth transistors are alternatively operated to output the first and second portions of the auxiliary A.C. signals to the load.

15. The inverter circuit of claim 14 in which said third transformer member includes a first secondary winding connected to the gate electrode of said third transistor and a second secondary winding connected to the gate electrode of said fourth transistor enabling the transistors for operation in response to the third transformer member receiving said first and second oppositely phased system clock signals, said first transformer member having a secondary winding including a mid portion connected to the source electrode of the third transistor and said second transformer having a secondary winding including a mid portion connected to the source electrode of the fourth transistor whereby the third transistor will output a first portion off the auxiliary A.C. signal in response to receiving a first oppositely phased system clock signal and the fourth transistor outputting a second portion of the auxiliary A.C. signal in response to receiving a second oppositely phased system clock signal.

* * * * *